US007794323B2

(12) United States Patent
Cannon

(10) Patent No.: US 7,794,323 B2

(45) Date of Patent: Sep. 14, 2010

(54) GAMING APPARATUS WITH ENCRYPTION AND METHOD

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 733 days.

(21) Appl. No.: 10/627,515

(22) Filed: Jul. 25, 2003

(65) Prior Publication Data

US 2005/0020356 A1 Jan. 27, 2005

(51) Int. Cl.

| | |
|---|---|
| ***A63F 13/12*** | (2006.01) |
| ***A63F 13/10*** | (2006.01) |
| ***H04L 9/30*** | (2006.01) |
| *A63F 5/04* | (2006.01) |
| *G07F 17/34* | (2006.01) |

(52) U.S. Cl. ............................ 463/29; 463/40; 463/42; 380/251

(58) Field of Classification Search .................. 463/16, 463/25, 26–27, 29, 40–42, 43, 13, 15, 38–39, 463/46, 47; 380/251, 28–30, 54; 705/50, 705/51, 54, 59

See application file for complete search history.

(56) References Cited

U.S. PATENT DOCUMENTS

| | | | | |
|---|---|---|---|---|
| 3,825,905 | A | 7/1974 | Allen, Jr. | 340/172.5 |
| 3,838,264 | A | 9/1974 | Maker | 253/153 |
| 4,200,770 | A | 4/1980 | Hellman et al. | 178/22 |
| 4,218,582 | A | 8/1980 | Hellman et al. | 178/22 |
| 4,354,251 | A | 10/1982 | Hellwig et al. | 364/900 |
| 4,405,829 | A | 9/1983 | Rivest et al. | 178/22.1 |
| 4,462,076 | A | 7/1984 | Smith, III | 364/200 |
| 4,467,424 | A | 8/1984 | Hedges et al. | 364/412 |

(Continued)

FOREIGN PATENT DOCUMENTS

EP 0 661 675 A2 * 7/1995

(Continued)

OTHER PUBLICATIONS

O'Reilly "Practical UNIX & Internet Security," by Garfinkel, et al. 2nd ed., Apr. 1996, ISBN 1-56592-148-8, downloaded Aug. 16, 2007 from www.unix.org.ua/orelly/networking/puis/index.htm.*

(Continued)

*Primary Examiner*—Peter DungBa Vo
*Assistant Examiner*—Matthew D. Hoel
(74) *Attorney, Agent, or Firm*—Weaver Austin Villeneuve & Sampson, LLP

(57) ABSTRACT

A gaming apparatus may comprise a display unit, a value input device, and a controller having a processor and a memory that stores first gaming data and encrypted gaming data that was generated by doubly encrypting gaming data utilizing an encryption key of a gaming data authoring organization and an encryption key of a gaming regulatory organization. The controller may be programmed to doubly decrypt the encrypted gaming data utilizing an encryption key of the gaming data authoring organization and an encryption key of the gaming regulatory organization to form decrypted gaming data, to check to determine if the first gaming data is authorized based on the decrypted gaming data and the first gaming data, and to cause, if the first gaming data is authorized, the display unit to generate a game display.

8 Claims, 18 Drawing Sheets

U.S. PATENT DOCUMENTS

| | | | | |
|---|---|---|---|---|
| 4,670,857 | A * | 6/1987 | Rackman | 705/51 |
| 4,727,544 | A | 2/1988 | Brunner et al. | 371/21 |
| 4,752,068 | A | 6/1988 | Endo | 273/1 E |
| 4,759,064 | A | 7/1988 | Chaum | 380/30 |
| 4,837,728 | A | 6/1989 | Barrie et al. | 364/412 |
| 4,845,715 | A | 7/1989 | Francisco | 371/53 |
| 4,856,787 | A | 8/1989 | Itkis | 273/237 |
| 4,865,321 | A | 9/1989 | Nakagawa et al. | 273/85 |
| 4,911,449 | A | 3/1990 | Dickinson et al. | 273/143 |
| 4,930,073 | A | 5/1990 | Cina, Jr. | 364/300 |
| 5,004,232 | A | 4/1991 | Wong et al. | 273/435 |
| 5,161,193 | A | 11/1992 | Lampson et al. | 380/49 |
| 5,224,160 | A | 6/1993 | Paulini et al. | 380/4 |
| 5,235,642 | A | 8/1993 | Wobber et al. | 380/25 |
| 5,283,734 | A | 2/1994 | Von Kohorn | 364/412 |
| 5,288,978 | A | 2/1994 | Iijima | 235/380 |
| 5,291,585 | A | 3/1994 | Sato et al. | 395/500 |
| 5,326,104 | A | 7/1994 | Pease et al. | 273/138 |
| 5,343,527 | A | 8/1994 | Moore | 380/4 |
| 5,398,932 | A | 3/1995 | Eberhardt et al. | 273/138 |
| 5,421,006 | A | 5/1995 | Jablon et al. | 395/575 |
| 5,489,095 | A | 2/1996 | Goudard et al. | 273/138 |
| 5,604,801 | A | 2/1997 | Dolan et al. | 380/21 |
| 5,643,086 | A | 7/1997 | Alcorn et al. | 463/29 |
| 5,644,704 | A | 7/1997 | Pease et al. | 395/183.18 |
| 5,655,965 | A | 8/1997 | Takemoto et al. | 463/20 |
| 5,664,017 | A * | 9/1997 | Gressel et al. | 380/30 |
| 5,725,428 | A | 3/1998 | Achmuller | 463/20 |
| 5,737,418 | A | 4/1998 | Saffari et al. | 380/9 |
| 5,759,102 | A | 6/1998 | Pease et al. | 463/42 |
| 5,768,382 | A | 6/1998 | Schneier et al. | 380/23 |
| 6,035,397 | A * | 3/2000 | Campinos et al. | 380/28 |
| 6,071,190 | A | 6/2000 | Weiss et al. | 463/25 |
| 6,099,408 | A * | 8/2000 | Schneier et al. | 463/29 |
| 6,104,815 | A | 8/2000 | Alcorn et al. | 380/251 |
| 6,149,522 | A | 11/2000 | Alcorn et al. | 463/29 |
| 6,219,836 | B1 * | 4/2001 | Wells et al. | 717/178 |
| 6,236,971 | B1 * | 5/2001 | Stefik et al. | 705/1.1 |
| 6,264,561 | B1 * | 7/2001 | Saffari et al. | 463/42 |
| 6,508,709 | B1 * | 1/2003 | Karmarkar | 463/42 |
| 6,708,157 | B2 * | 3/2004 | Stefik et al. | 705/59 |
| 6,866,586 | B2 * | 3/2005 | Oberberger et al. | 463/42 |
| 6,959,290 | B2 * | 10/2005 | Stefik et al. | 705/51 |
| 7,043,641 | B1 * | 5/2006 | Martinek et al. | 713/187 |
| 2002/0046181 | A1 * | 4/2002 | Story et al. | 705/59 |
| 2002/0057800 | A1 | 5/2002 | Gordon et al. | 380/21 |
| 2002/0116615 | A1 * | 8/2002 | Nguyen et al. | 713/168 |
| 2002/0174160 | A1 * | 11/2002 | Gatto et al. | 709/1 |
| 2003/0008704 | A1 | 1/2003 | Gauselmann | 463/20 |
| 2003/0014639 | A1 | 1/2003 | Jackson et al. | 713/181 |
| 2003/0064771 | A1 | 4/2003 | Morrow et al. | 463/16 |
| 2003/0069074 | A1 | 4/2003 | Jackson | 463/43 |
| 2003/0074323 | A1 * | 4/2003 | Catan | 705/59 |
| 2003/0130032 | A1 * | 7/2003 | Martinek et al. | 463/29 |
| 2003/0194092 | A1 * | 10/2003 | Parks et al. | 380/281 |
| 2003/0203755 | A1 | 10/2003 | Jackson | 463/42 |
| 2003/0203756 | A1 | 10/2003 | Jackson | 463/42 |
| 2003/0228912 | A1 * | 12/2003 | Wells et al. | 463/43 |
| 2004/0127277 | A1 * | 7/2004 | Walker et al. | 463/16 |
| 2006/0040745 | A1 * | 2/2006 | Wells et al. | 463/42 |

FOREIGN PATENT DOCUMENTS

| | | | |
|---|---|---|---|
| EP | 1 004 970 | A2 | 5/2000 |
| EP | 1352677 | A2 | 10/2003 |
| WO | 01/06691 | A2 | 1/2001 |
| WO | WO 01/06691 | A2 * | 1/2001 |
| WO | 03/045519 | A1 | 6/2003 |
| WO | WO 03/045519 | A1 * | 6/2003 |

OTHER PUBLICATIONS

"Cryptography Decrypted," by Mel, et al., 2001, Addison-Wesley, New York, chapters 5 and 10 on DES and public keys.*

Bakhtiari, et al., "Cryptographic Hash Functions: A Survey," Centre for Computer Security Research, 1995, 3 introductory pages and pp. 1-26.

Bauspiess, et al., "Requirements For Cryptographic Hash Functions," *Computers and Security*, 5:427-437 (Sep. 11, 1992).

Federal Information Processing Standards (FIPS) Publication 180 entitled "Secure Hash Standard" dated May 11, 1993, title page, abstract page and pp. 1-20.

Federal Information Processing Standards (FIPS) Publication 186 entitled "Digital Signature Standard (DSS)" dated May 19, 1994, 17 pages.

Document entitled "Fact Sheet on Digital Signature Standard" dated May 1994, 6 pages.

Federal Information Processing Standards (FIPS) Publication 180-1 entitled "Secure Hash Standard" dated Apr. 17, 1995, 2 title pages, abstract page and pp. 1-21.

International Search Report issued in PCT/US04/022581 and completed Oct. 13, 2004.

* cited by examiner

GAMING APPARATUS WITH ENCRYPTION AND METHOD

BACKGROUND

This patent is directed to a gaming apparatus with encryption and a method of operating the gaming apparatus.

A gaming apparatus of the type used in casinos has included a display unit such as a video display unit or a set of mechanical slot machine reels, a value input device such as a coin slot or paper currency reader, and a controller operatively coupled to the display unit and the value input device and having a processor and a memory operatively coupled to the processor. The controller was programmed to control the overall functions of the gaming machine, including generating game displays representing one or more of a number of casino games, such as poker, blackjack, slots, keno or bingo.

U.S. Pat. No. 6,149,522 to Alcorn, et al. discloses a gaming apparatus of the type described above. The Alcorn, et al. patent also discloses the preparation of gaming data which includes subjecting the gaming data to a hash function to generate a message digest and the subsequently encrypting of the message digest using an encryption key to form an encrypted message digest. Gaming data is authenticated by the gaming apparatus by decrypting the encrypted message digest and then comparing that unencrypted message digest with a hash of the original gaming data. U.S. Pat. No. 5,759,102 to Pease, et al. discloses a method and apparatus for downloading information to a plurality of gaming terminals from a central computer.

SUMMARY OF THE INVENTION

In one aspect, the invention is directed to a gaming apparatus that may comprise a display unit, a value input device, and a controller operatively coupled to the display unit and the value input device. The controller may comprise a processor and a memory and may be programmed to receive downloadable gaming data from a data storage device external to the gaming apparatus and to receive encrypted gaming data from the data storage device that was generated by performing a data-abbreviating function on gaming data to form first abbreviated gaming data and by doubly encrypting the first abbreviated gaming data utilizing an encryption key of a gaming data authoring organization and an encryption key of a gaming regulatory organization.

The controller may also be programmed to doubly decrypt the encrypted gaming data utilizing an encryption key of the gaming data authoring organization and an encryption key of the gaming regulatory organization to form decrypted gaming data, to perform a data-abbreviating function on the downloadable gaming data to generate second abbreviated gaming data, to compare the decrypted gaming data with the second abbreviated gaming data to determine if the downloadable gaming data is authorized.

In another aspect, the invention is directed to a gaming apparatus that may comprise a display unit, a value input device, and a controller operatively coupled to the display unit and the value input device. The controller may comprise a processor and a memory that stores first gaming data and encrypted gaming data that was generated by doubly encrypting gaming data utilizing an encryption key of a first gaming organization and an encryption key of a second gaming organization different than the first gaming organization. The controller may be programmed to doubly decrypt the encrypted gaming data utilizing an encryption key of the first gaming organization and an encryption key of the second gaming organization to form decrypted gaming data, to check to determine if the first gaming data is authorized based on the decrypted gaming data and the first gaming data.

In a further aspect, the invention is directed to a method of operation of a gaming apparatus that may comprise receiving at the gaming apparatus downloadable gaming data from a data storage device external to the gaming apparatus; receiving encrypted gaming data from the data storage device, the encrypted gaming data having been generated by performing a data-abbreviating function on gaming data to form first abbreviated gaming data and by doubly encrypting the first abbreviated gaming data utilizing an encryption key of a first gaming organization and an encryption key of a second gaming organization; doubly decrypting the encrypted gaming data utilizing an encryption key of the first gaming organization and an encryption key of the second gaming organization to form decrypted gaming data; performing a data-abbreviating function on the downloadable gaming data to generate second abbreviated gaming data; and comparing the decrypted gaming data with the second abbreviated gaming data to determine if the downloadable gaming data is authorized.

In another aspect, the invention is directed to a method of operating a gaming apparatus having a memory with first gaming data stored therein and encrypted gaming data that was generated by doubly encrypting gaming data stored therein. The method may comprise doubly decrypting the encrypted gaming data utilizing a first encryption key and a second encryption key different than the first encryption key to form decrypted gaming data; checking to determine if the first gaming data is authorized based on the decrypted gaming data and the first gaming data; and causing a game display representing one of the following games to be generated: poker, blackjack, slots, keno or bingo.

In a further aspect, the invention is directed to a method of generating gaming data that is to be subsequently stored in a gaming apparatus that may comprise generating gaming data that is to be used in the gaming apparatus; performing a data-abbreviating function on the gaming data to generate abbreviated gaming data; causing the gaming data to be doubly encrypted with a first encryption key and a second encryption key different than the first encryption key to generate encrypted gaming data; and causing the gaming data to be transferred to a controller operatively coupled to the gaming apparatus.

In another aspect, the invention is directed to a memory having a computer program stored therein that is capable of being used in connection with a gaming apparatus with first gaming data stored therein and encrypted gaming data that was generated by doubly encrypting gaming data stored therein. The memory may comprise a memory portion physically configured in accordance with computer program instructions that would cause the gaming apparatus to doubly decrypt the encrypted gaming data utilizing a first encryption key and a second encryption key different than the first encryption key to form decrypted gaming data; a memory portion physically configured in accordance with computer program instructions that would cause the gaming apparatus to check to determine if the first gaming data is authorized based on the decrypted gaming data and the first gaming data; and a memory portion physically configured in accordance with computer program instructions that would cause the gaming apparatus to generate a game display associated with one of the following games: poker, blackjack, slots, keno or bingo.

In a further aspect, the invention is directed to a method of operating a gaming apparatus that may comprise retrieving from memory first encrypted gaming data that was generated by encrypting gaming data relating to a casino game utilizing an encryption key of a first gaming organization; decrypting the first encrypted gaming data utilizing an encryption key of the first gaming organization to form first decrypted gaming data; retrieving from memory second encrypted gaming data that was generated by encrypting gaming data relating to a casino game utilizing an encryption key of a second gaming organization; decrypting the second encrypted gaming data utilizing an encryption key of the second gaming organization to form second decrypted gaming data; and determining if the first decrypted gaming data is identical to the second decrypted gaming data.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
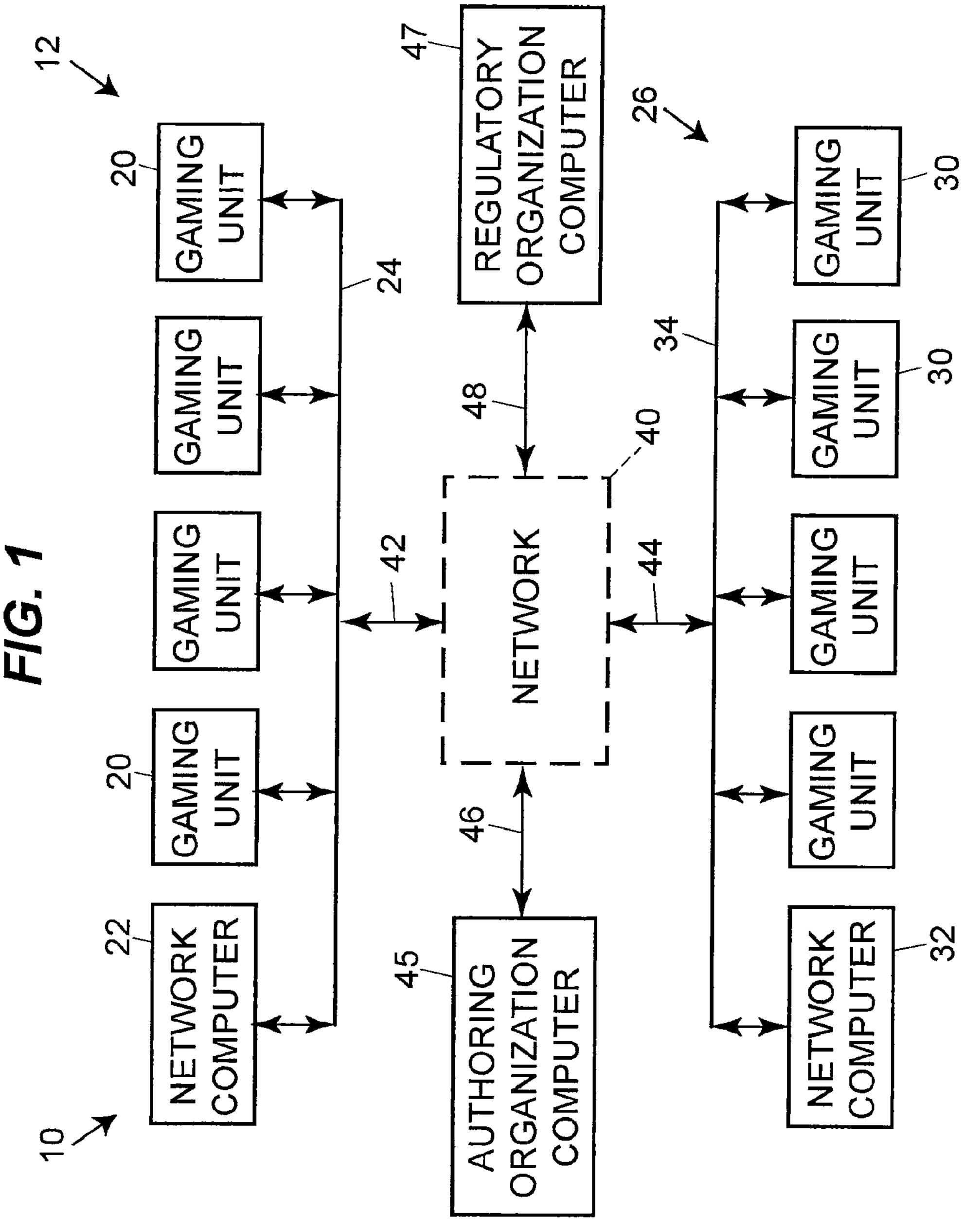
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming machines or units 20 operatively coupled to a network computer 22 via a network data link or bus 24. The casino gaming system 10 may include a second group or network 26 of casino gaming machines or units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

The casino gaming system 10 may be operatively coupled to a gaming data authoring organization computer 45 via a data link 46 and to a gaming regulatory organization computer 47 via a data link 48. The gaming data authoring organization computer 45 may be, for example, a server or other computer disposed at a location remote from the other parts of the system 10, such as a computer located at the facilities of a gaming machine manufacturer. The gaming regulatory organization computer 47 may be, for example, a server or other computer disposed at a location of a gaming regulatory organization, such as a state gaming regulatory organization. Each of the computers 45, 47 may include the components of a computer, including one or more processors and one or more memories, as shown in the controller 100 in the left-hand side of FIG. 2B.

Figure 2:
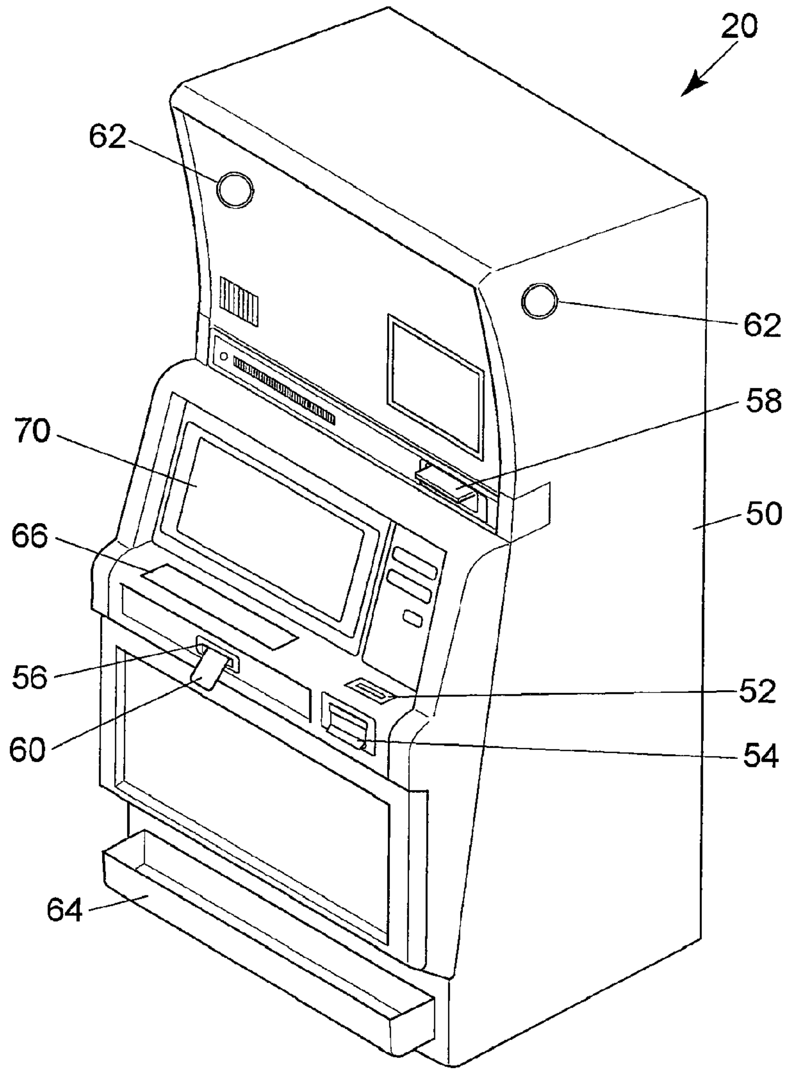
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a display unit 70 for generating game displays. The display unit 70 may comprise a video display unit capable of generating electronically generated images or it may comprise a plurality of mechanical slot machine reels. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
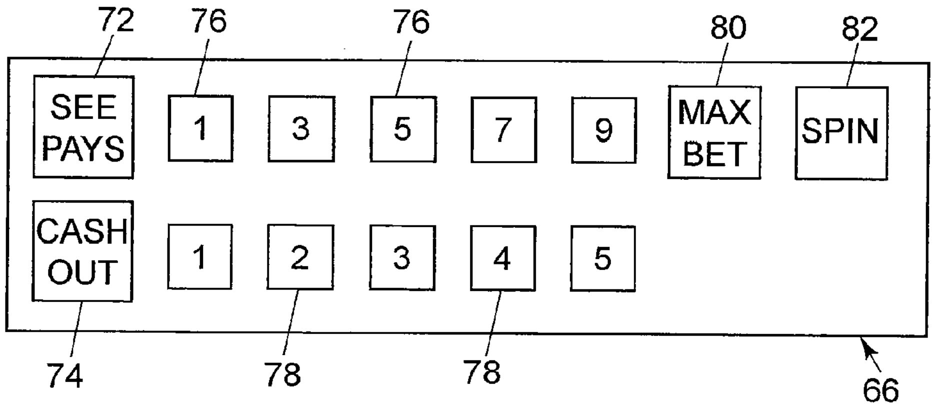
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 (if provided as a video display unit) to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the “5” button 76 (meaning that five paylines were to be played on the next spin of the reels) and then activate the “3” button 78 (meaning that three coins per payline were to be wagered), the total wager would be $3.75 (assuming the minimum bet was $0.25).

The control panel 66 may include a “Max Bet” button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term “control panel” should not be construed to imply that a panel or plate separate from the housing 50 of the gaming unit 20 is required, and the term “control panel” may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70 (if provided as a video display unit). In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 2B:
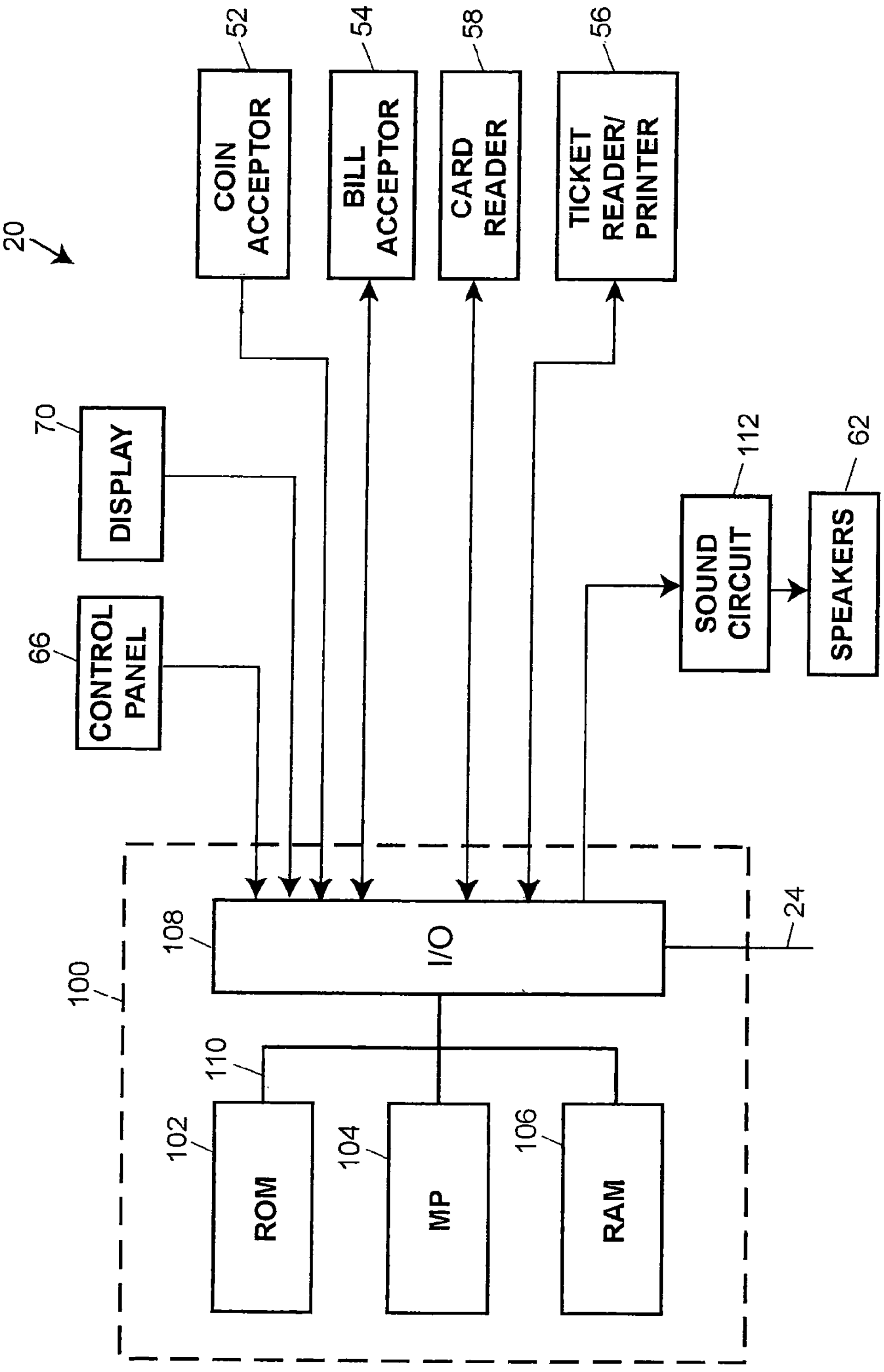
FIG. 2B is a block diagram of the electronic components of the gaming unit of FIG. 2.

FIG. 2B is a block diagram of a number of components that may be incorporated in the gaming unit 20. Referring to FIG. 2B, the gaming unit 20 may include a controller 100 that may comprise a read-only memory (ROM) 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple ROMs 102. Although the I/O circuit 108 is shown as a single block, it should be appreciated that the I/O circuit 108 may include a number of different types of I/O circuits. The RAM(s) 106 and ROMs 102 may be implemented as semiconductor memories, magnetically readable memories, hard disk memories and/or optically readable memories such as CDROMs, for example.

FIG. 2B illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 2B, the components 52, 54, 56, 58, 66, 112 may be connected to the I/O circuit 108 via a respective direct line or conductor. Different connection schemes could be used. For example, one or more of the components shown in FIG. 2B may be connected to the I/O circuit 108 via a common bus or other data link that is shared by a number of components. Furthermore, some of the components may be directly connected to the microprocessor 104 without passing through the I/O circuit 108.

Preparation of Gaming Data

Gaming data that is utilized by one or more of the gaming units 20 (or 30) may be prepared by a gaming data authoring organization prior to the gaming data being stored in the gaming unit 20. As described below, such preparation may include subjecting the gaming data to a data-abbreviating function and a number of data encryptions. After being prepared, the gaming data may be transmitted or downloaded into one (or more) of the gaming units 20, and the gaming unit 20 may perform various operations on the gaming data, before the gaming data is utilized in the control of the gaming unit 20, to determine whether the gaming data is authentic and has not been corrupted, either intentionally or unintentionally.

Figure 3A:
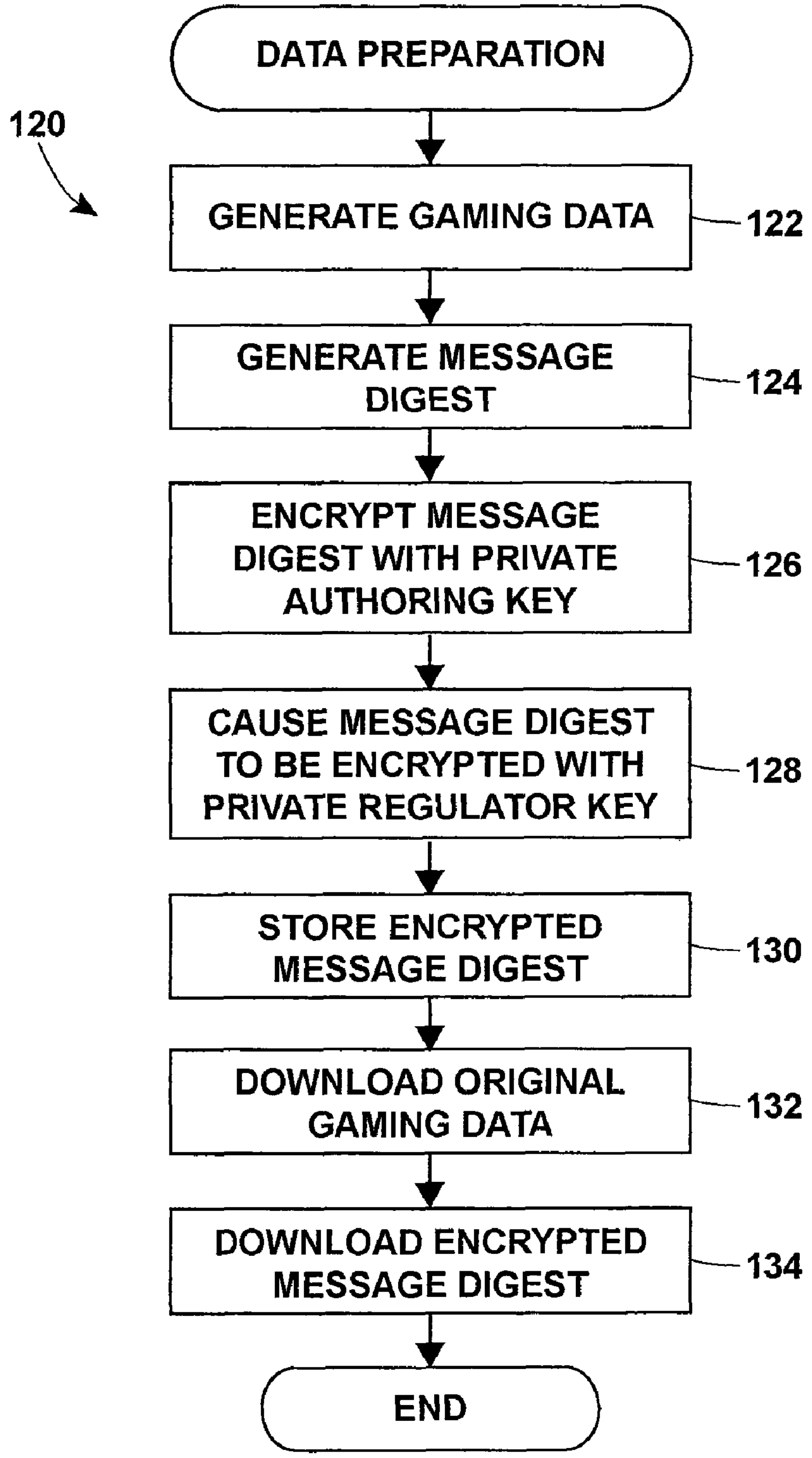
FIG. 3A is a flowchart of a first embodiment of a data preparation routine.

FIG. 3A is a flowchart of a first embodiment of a data preparation routine 120, which may be performed by a gaming data authoring organization, such as a slot machine manufacturer for example. Referring to FIG. 3A, at block 122 the gaming data that is ultimately to be transmitted or downloaded to a gaming unit 20 may be authored or generated, by storing such data in the memory of a computer, for example. This gaming data may comprise all of the gaming data necessary to control the operation of the gaming unit 20, or it may comprise just part of such gaming data.

At block 124, an abbreviating function may be performed on the gaming data generated at block 122. The abbreviating function may be a hash function, in which case a message digest will be produced. If a hash function is used, the resultant message digest will have a fixed length, regardless of how much gaming data was subjected to the hash function. Any type of hash function may be used, such as described in U.S. Pat. No. 6,149,522 to Alcorn, et al., which is incorporated by reference herein in its entirety.

At block 126, the abbreviated gaming data or message digest (if a hash function was used) may be encrypted using an encryption key to generate encrypted gaming data. The encryption key used at block 126 may be the private encryption key of the authoring organization. The use of private and public encryption keys is well known, and any kind of encryption may be used, such as described in U.S. Pat. No. 6,149,522 that is incorporated by reference herein.

At block 128, the authoring organization may cause the gaming data encrypted at block 126 to be encrypted using another encryption key that is different than the encryption key used at block 126. For example, the encryption key used at block 128 may be the private encryption key of a gaming regulatory organization, such as a Nevada gaming regulatory organization. Any kind of encryption may be used, such as described in U.S. Pat. No. 6,149,522 that is incorporated by reference herein. The authoring organization may cause the gaming data to be encrypted at block 126 by transmitting the gaming data, for example, from the authoring organization computer 45 to the gaming regulatory computer 47 via the network 40 with the understanding that the gaming regulatory organization would encrypt the gaming data. Other ways of transferring the data, such as by causing a disk or other storage medium on which the gaming data was stored to be physically transported to the regulatory organization.

At block 130, the gaming data that was further encrypted by the regulatory organization may be stored in the memory of the authoring computer 45. This could be performed after the electronic transmission of the additionally encrypted gaming data from the regulatory organization computer 47 to the authoring organization computer 45, or after a different type of data transfer.

Blocks 132-134 illustrate various data that could be transmitted or downloaded from the gaming data authoring organization computer 45 to one or more of the network computers 22, 32, and/or from one or more of the network computers 22, 32 to one or more of the gaming units 20, and/or from the gaming data authoring organization computer 45 to one or more of the gaming units 20.

At block 132, a copy of the original gaming data that was generated at block 122 (and subjected to the acts performed at blocks 124-130) may be, downloaded or transferred to the gaming unit 20. At block 134, the encrypted gaming data that was generated at block 128 and stored at block 130 may be downloaded or transferred to the gaming unit 20.

The acts that are performed on the gaming data that occur at blocks 124, 126, 128, 130, 132 and/or 134 may be done on all of the gaming data at one time, or they may be done a number of times on separate parts of the gaming data. For example, where a relatively large amount of gaming data is to be acted on, the gaming data could be separated into blocks of data, and each block could be processed as described in connection with blocks 124-130. Also, although the acts described in blocks 132, 134 are shown separately in FIG. 3A, it should be understood that all such data could be transferred substantially simultaneously as part of a single data transfer. The order in which the encryption is performed on the gaming data at blocks 126, 128 could be reversed.

Figure 3B:
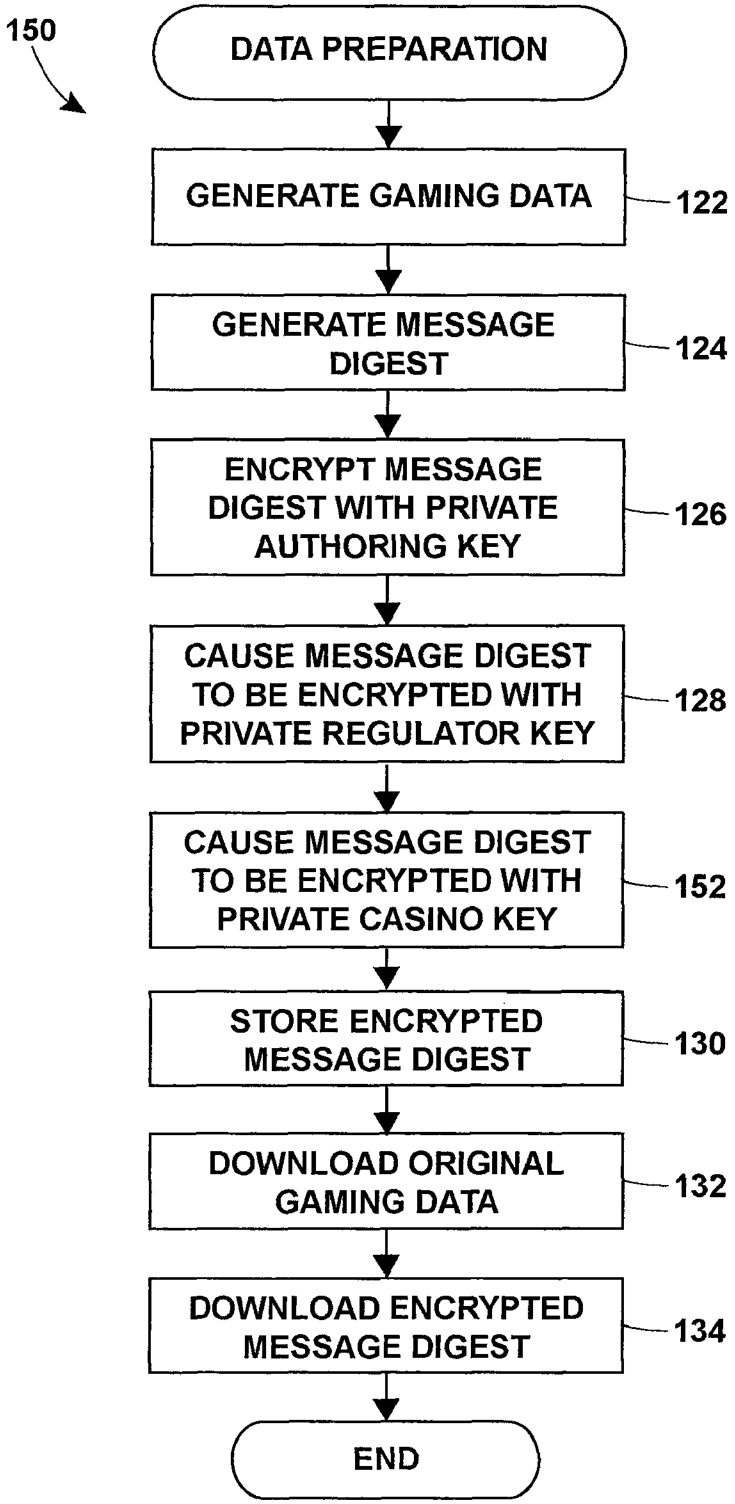
FIG. 3B is a flowchart of a second embodiment of a data preparation routine.

FIG. 3B is a flowchart of a second embodiment of a data preparation routine 150, which may be performed by a gaming data authoring organization, for example. The routine 150 includes a number of the acts that may be identical to acts described above in connection with the data preparation routine 120, which acts are referred to by the same reference numerals in both FIGS. 3A and 3B. Only the additional acts shown in FIG. 3B are described below.

Referring to FIG. 3B, the data preparation routine 150 may include two additional acts. At block 152, the authoring organization may cause the gaming data encrypted at block 128 to be encrypted using another encryption key that is different than the encryption keys used at blocks 126, 128. For example, the encryption key used at block 152 may be the private encryption key of a casino. Any kind of encryption may be used, such as described in U.S. Pat. No. 6,149,522 that is incorporated by reference herein. The authoring organization may cause the gaming data to be encrypted at block 152 by transmitting the gaming data, for example, from the authoring organization computer 45 to one of the network computers 22, 32 located in the casino via the network 40 with the understanding that the casino would encrypt the gaming data. Other ways of transferring the data, such as by causing a disk or other storage medium on which the gaming data was stored to be physically transported to the casino.

Data Storage

Figure 2C:
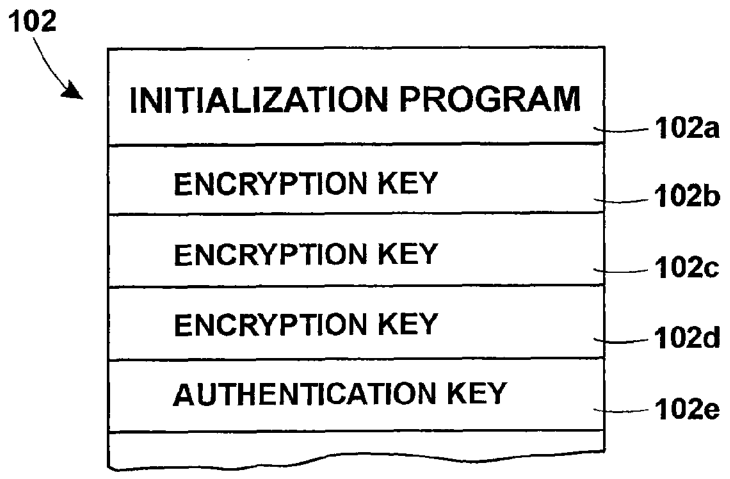
FIGS. 2C-2E illustrate various data that may be stored in the memory of the gaming unit.
Figure 2D:
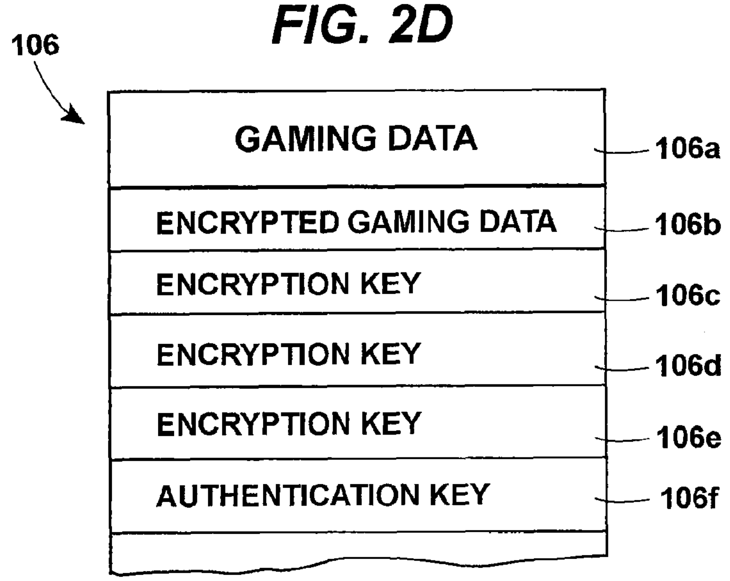
Figure 2E:
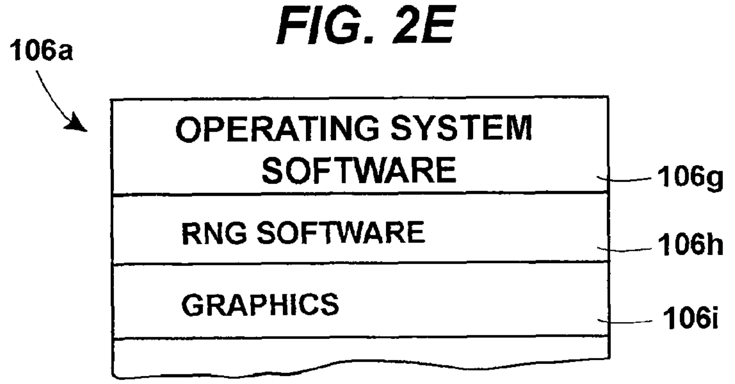

FIGS. 2C-2E illustrate various data that may be stored in the memories of the controller 100 of a gaming unit 20. Referring to FIG. 2C, the ROM 102 of the controller 100 shown in FIG. 2B may include a number of data segments, including an initialization computer program in a memory portion 102*a*, a first encryption key such as a public casino encryption key in a memory portion 102*b*, a second encryption key such as a public gaming data authoring organization encryption key in a memory portion 102*c*, a third encryption key such as a public gaming regulatory organization encryption key in a memory portion 102*d*, and an authentication key in a memory portion 102*e*. The term “encryption key” as used herein encompasses keys that are used to encrypt data as well as keys used to decrypt data.

The initialization program stored in the memory portion 102*a* may include computer program instructions to cause a number of initialization procedures to be performed during startup of the gaming unit 20, and the initialization program may include computer program instructions that form an authentication routine, such as the routines shown in FIGS. 4A-4C and described below in connection therewith. The authentication key stored in the memory portion 102*e* may be provided where gaming data is encrypted without the prior use of a data-abbreviating function such as a hash function. A “data-abbreviating” function is one that transforms a set of first set of data into a second set of data that is smaller than the first set of data, such as a data-compression function.

Referring to FIG. 2D, the RAM 106 of the controller 100 shown in FIG. 2B may include a number of data segments, including a set of gaming data in a memory portion 106*a*, encrypted gaming data in a memory portion 106*b*, a first encryption key such as a public casino encryption key in a memory portion 106*c*, a second encryption key such as a public gaming data authoring organization encryption key in a memory portion 106*d*, a third encryption key such as a public gaming regulatory organization encryption key in a memory portion 106*e*, and an authentication key in a memory portion 106*f*. The keys described in this paragraph may downloaded or otherwise stored in the memory portions 106*c*-106*f* prior to the download of the gaming data that is to be authenticated.

It should be understood that while both FIGS. 2C and 2D show the storage in memory of three encryption keys, it is only necessary to store such keys in one of the memories. For example, where the keys are downloaded prior to the download of gaming data, the keys could be stored in the RAM 106, whereas if the keys were not downloaded, they could be permanently stored in the ROM 102.

Referring to FIG. 2E, the gaming data stored in the RAM memory portion 106*a* may include a number of data segments, including operating system software stored in a memory portion 106*g*, random number generator software stored in a memory portion 106*h* and graphics data stored in a memory portion 106*i* that is used in connection with the generation of various displays, such as those shown in FIGS. 6, 7, 10, 11 and 14. The operating system software may comprise the operating system software designed for a general-purpose personal computer, and the random number generator software may comprise computer program instructions that generate random or pseudo-random numbers, which may be necessary during operation of the casino games described herein.

Authentication of Gaming Data by Gaming Unit

After gaming data is transmitted or downloaded into one (or more) of the gaming units 20 as described above, the gaming unit 20 may perform various operations on the gaming data, before the gaming data is utilized to control the gaming unit 20, to determine whether the gaming data is authentic and has not been corrupted, either intentionally or unintentionally.

Figure 4A:
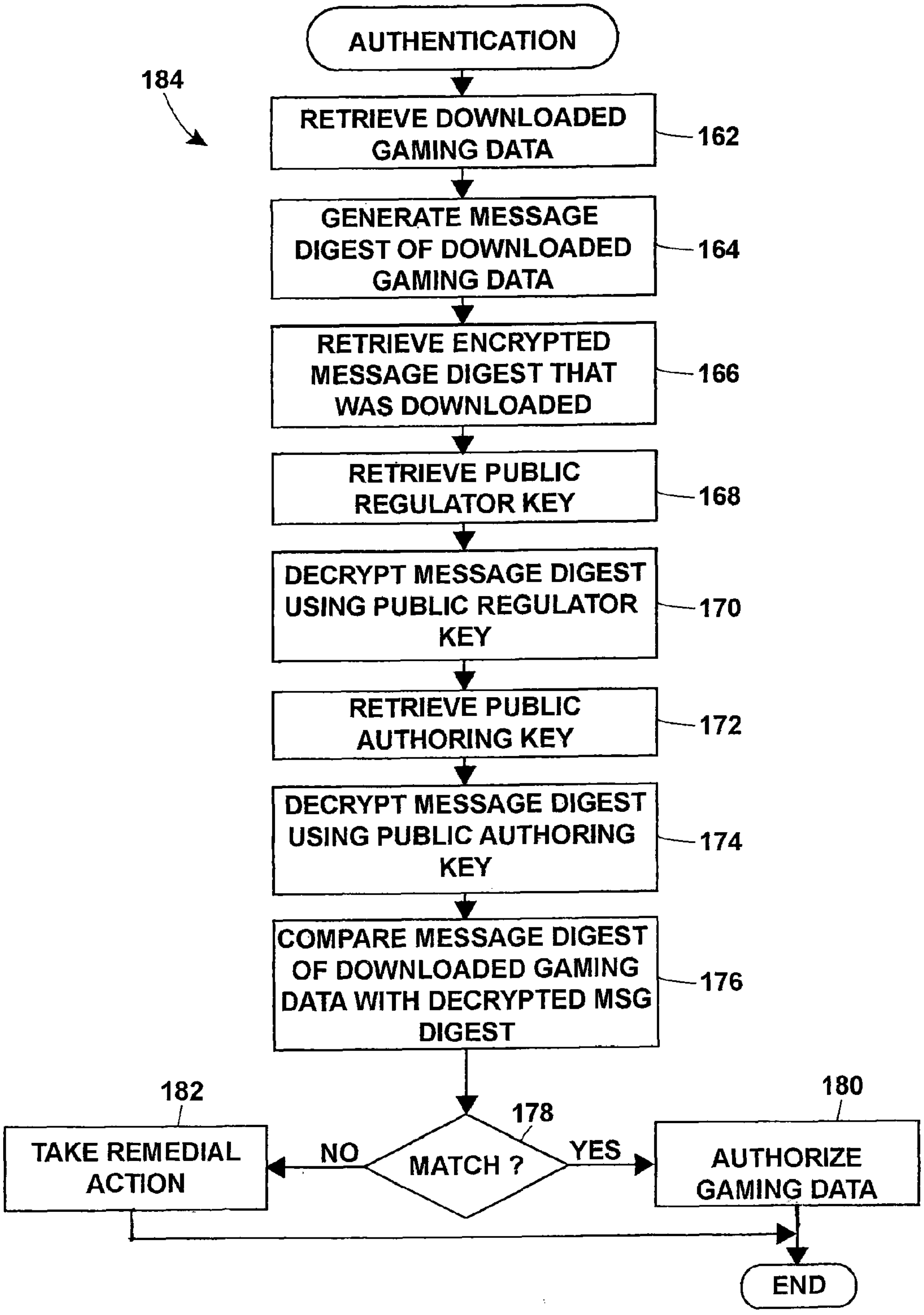
FIG. 4A is a flowchart of a first embodiment of an authentication routine.

FIG. 4A is a flowchart of a first embodiment of an authentication routine 160, which may be performed by the gaming unit 20. Referring to FIG. 4A, at block 162 the gaming data that was downloaded or transferred as a result of block 132 (FIG. 3A) may be retrieved from memory (e.g. from the RAM memory portion 106*a* shown in FIG. 2D). At block 164, the gaming data that was retrieved at block 162 may be subjected to a data-abbreviating function, such as a hash function, to generate a set of abbreviated data or a message digest.

At block 166, the encrypted data, such as an encrypted message digest, that was previously downloaded at block 134 of FIG. 3A may be retrieved from memory (e.g. from the RAM memory portion 106*b* shown in FIG. 2D). At block 168, the public regulatory organization encryption key may be retrieved from memory (e.g. from the ROM memory portion 102*d* shown in FIG. 2C or from the RAM memory portion 106*e* shown in FIG. 2D). At block 170 the doubly encrypted message digest retrieved at block 166 may be decrypted using the encryption key retrieved at block 168 to form a singly encrypted message digest.

At block 172, the public gaming data authoring encryption key may be retrieved from memory (e.g. from the ROM memory portion 102*c* shown in FIG. 2C or from the RAM memory portion 106*d* shown in FIG. 2D). At block 174 the singly encrypted message digest generated at block 170 may be decrypted using the encryption key retrieved at block 172 to form a completely decrypted message digest.

At block 176, the completely decrypted message digest generated at block 174 may be compared with the message digest that was generated at block 164. If the two message digests match as determined at block 178, it is assumed that the gaming data is authentic, and the operation of the gaming unit is enabled or authorized at block 180. If the two message digests do not match as determined at block 178, it is assumed that the gaming data is not authentic, and a remedial action, such as the transmission of an alarm message to the network computer 22 and/or disabling the operation of the gaming unit 20, is taken at block 182.

Figure 4B:
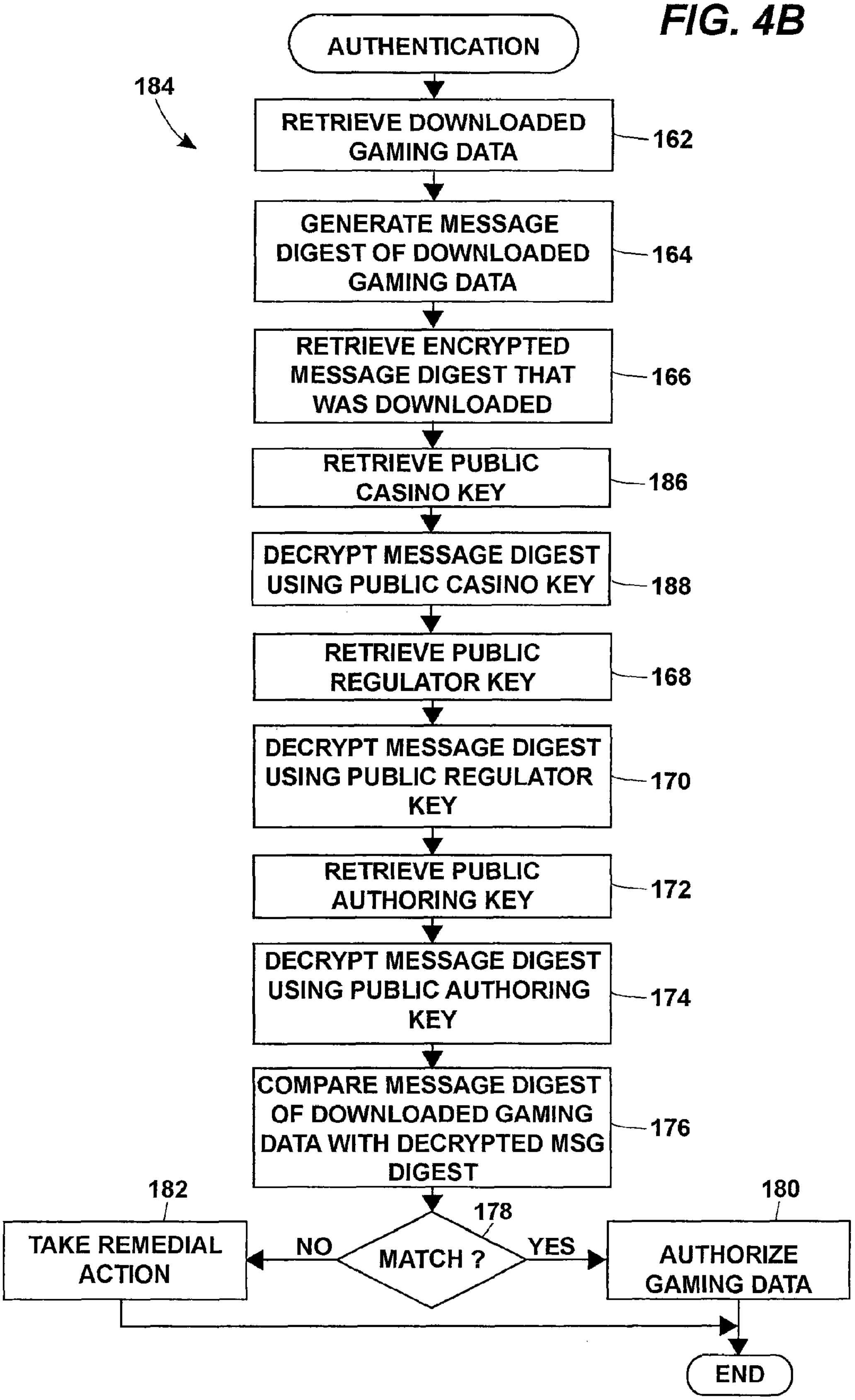
FIG. 4B is a flowchart of a second embodiment of an authentication routine.

FIG. 4B is a flowchart of a second embodiment of an authentication routine 184, which may be performed by one of the gaming units 20, for example. The routine 184, which may be utilized where the gaming data is to be encrypted and decrypted using additional encryption keys, such as a pair of public and private casino encryption keys, includes a number of the acts that may be identical to acts described above in connection with the authentication routine 160, which acts are referred to by the same reference numerals in both FIGS. 4A and 4B. Only the additional acts shown in FIG. 4B are described below.

Referring to FIG. 4B, the authentication routine 184 may include two additional acts. At block 186, a public casino key may be retrieved from the memory of the controller 100 (e.g. from ROM portion 102*b* if stored there or from RAM portion 106*c* if the public casino key was downloaded), and at block 188 the message digest may be further decrypted using the casino encryption key retrieved from memory at block 192.

Where no data-abbreviating function is utilized, the gaming data that is transferred to the gaming unit 20 may be authenticated by utilizing an authentication key, such as a password or random string of digital data. For example, the gaming unit 20 may determine whether the gaming data is authentic by comparing the authentication key stored in its ROM portion 102*e* with an authentication key that was downloaded and subsequently stored in the RAM portion 106*f*.

Figure 4C:
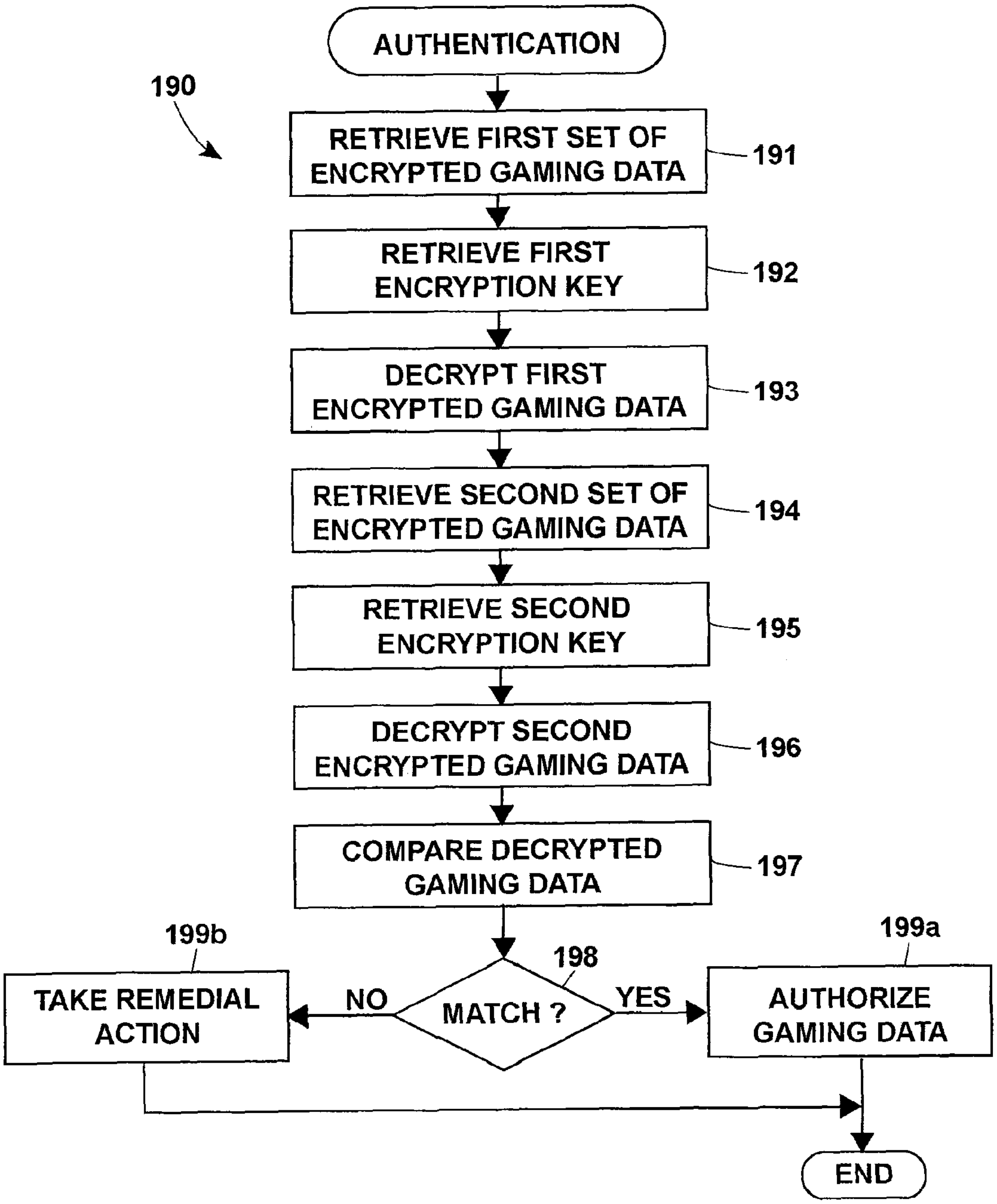
FIG. 4C is a flowchart of a third embodiment of an authentication routine.

FIG. 4C is a flowchart of a third embodiment of an authentication routine 190, which may be performed by one of the gaming units 20, for example. The routine 190 may be utilized where the same gaming data is downloaded or otherwise transferred to a gaming unit from two different sources.

For example, a gaming authoring organization may encrypt a first set of gaming data using a private key of the gaming authoring organization and then download the encrypted gaming data to the gaming unit 20. A gaming regulatory organization may encrypt a second set of gaming data that is identical to the first set of gaming data using a private key of the gaming regulatory organization and then download the encrypted gaming data to the gaming unit 20. Thus, the gaming unit 20 would have two differently encrypted sets of the same gaming data stored therein. The gaming unit could then decrypt each of the encrypted sets of gaming data with the corresponding encryption keys (i.e. public key of the authoring organization and public key of the regulatory organization) and if then compare the two decrypted sets of gaming data to see if they are identical. If so, the gaming data would be considered authentic.

Referring to FIG. 4C, at block 191 a first set of gaming data that was encrypted with a first encryption key (e.g. a private encryption key of a first gaming organization) and then downloaded or transferred to the gaming unit 20 may be retrieved from memory (e.g. from the RAM 106 shown in FIG. 2B). At block 192, an encryption key associated with the first encrypted gaming data (e.g. a public encryption key of the first gaming organization) may be retrieved from memory (e.g. from the ROM 102 or RAM 106 shown in FIG. 2B). At block 193 the first encrypted gaming data retrieved at block 191 may be decrypted using the first encryption key retrieved at block 192 to form a first set of decrypted gaming data.

At block 194 a second set of gaming data that was encrypted with a second encryption key (e.g. a private encryption key of a second gaming organization) and then downloaded or transferred to the gaming unit 20 may be retrieved from memory (e.g. from the RAM 106 shown in FIG. 2B). At block 195, an encryption key associated with the second encrypted gaming data (e.g. a public encryption key of the second gaming organization) may be retrieved from memory (e.g. from the ROM 102 or RAM 106 shown in FIG. 2B). At block 196 the second encrypted gaming data retrieved at block 194 may be decrypted using the second encryption key retrieved at block 195 to form a second set of decrypted gaming data.

At block 197, the two sets of decrypted gaming data that were generated at blocks 193, 196 may be compared with each other to determine if they are identical. If the gaming data matches as determined at block 197, it is assumed that the gaming data (both sets) is authentic, and the operation of the gaming unit is enabled or authorized at block 199*a*. If the two sets of gaming data do not match as determined at block 197, it is assumed that the gaming data is not authentic, and a remedial action, such as the transmission of an alarm message to the network computer 22 and/or disabling the operation of the gaming unit 20, is taken at block 199*b*.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 5:
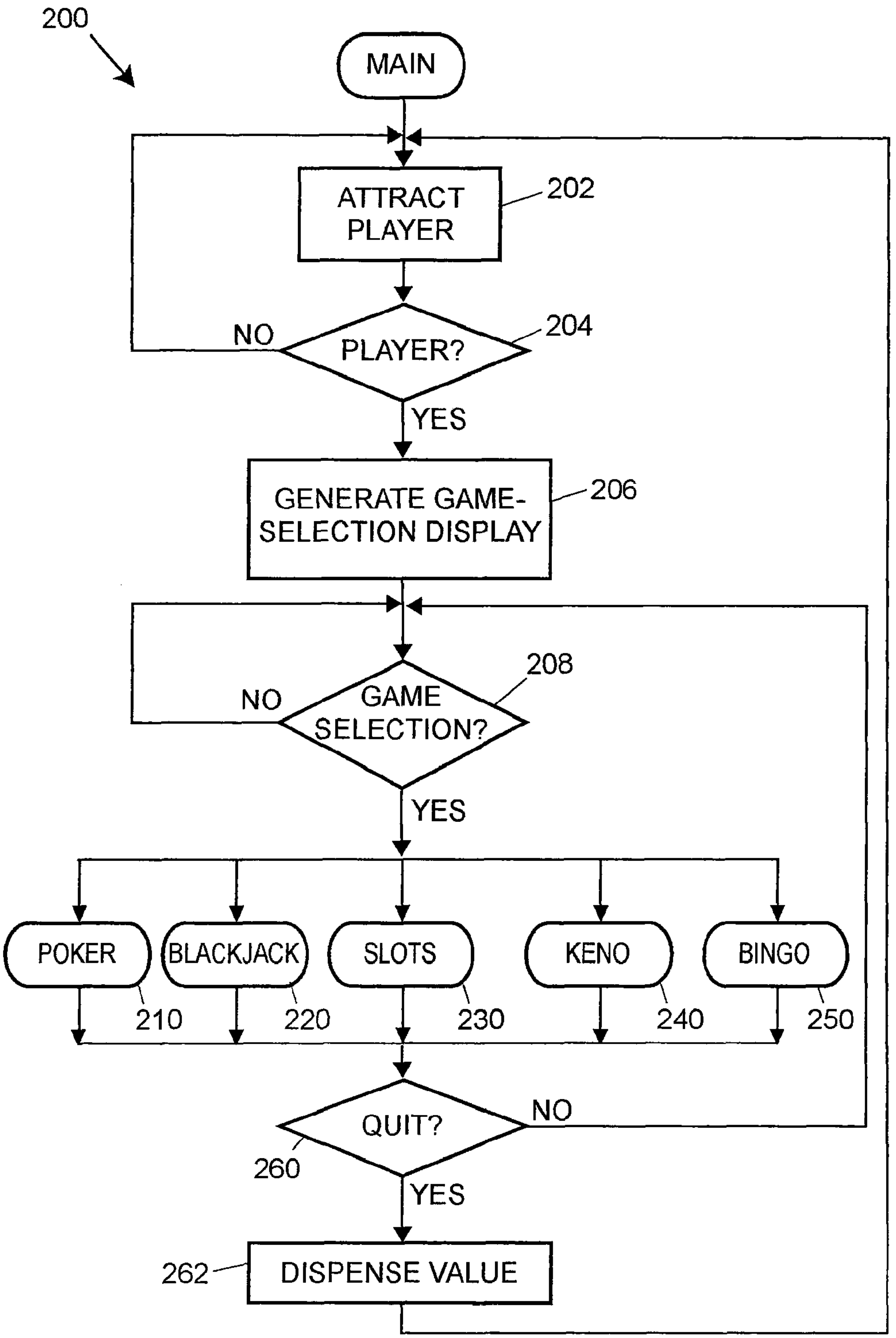
FIG. 5 is a flowchart of an embodiment of a main routine that may be performed during operation of one or more of the gaming units.

FIG. 5 is a flowchart of a main operating routine 200 that may be stored in the memory of the controller 100. Referring to FIG. 5, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 5, a different number of routines could be included to allow play of a different number of games. The gaming unit 20 may also be programmed to allow play of different games.

Video Poker

Figure 6:
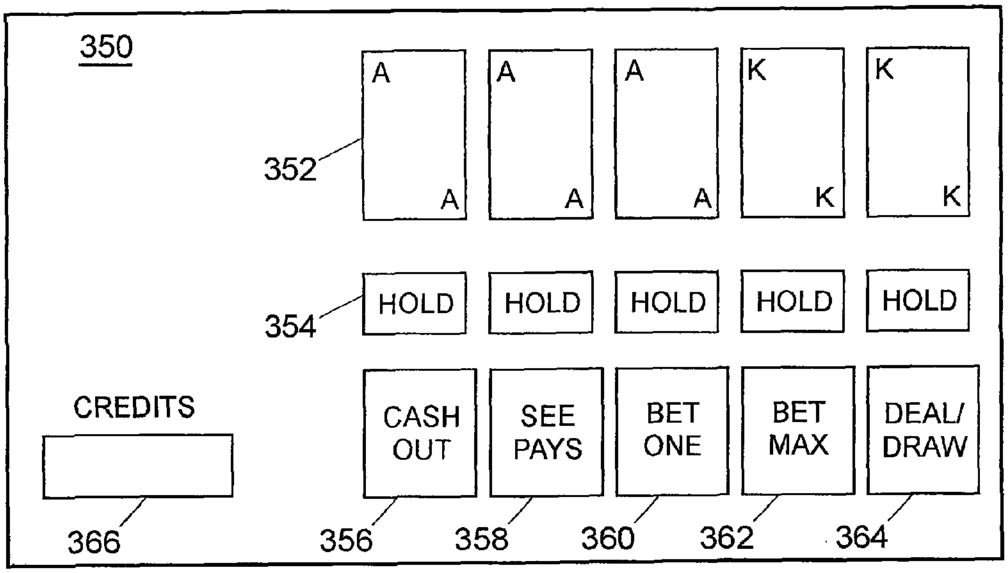
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
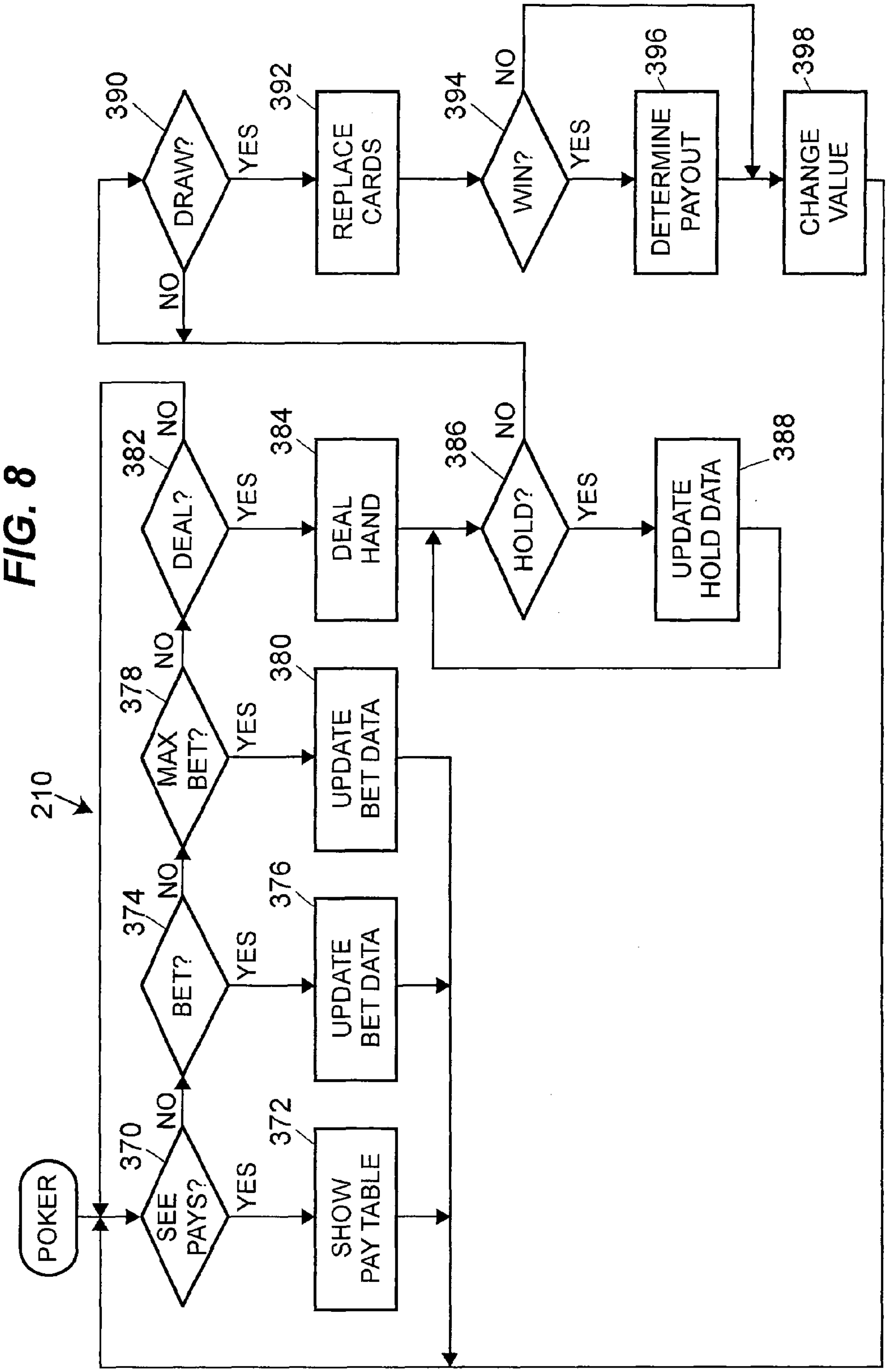
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
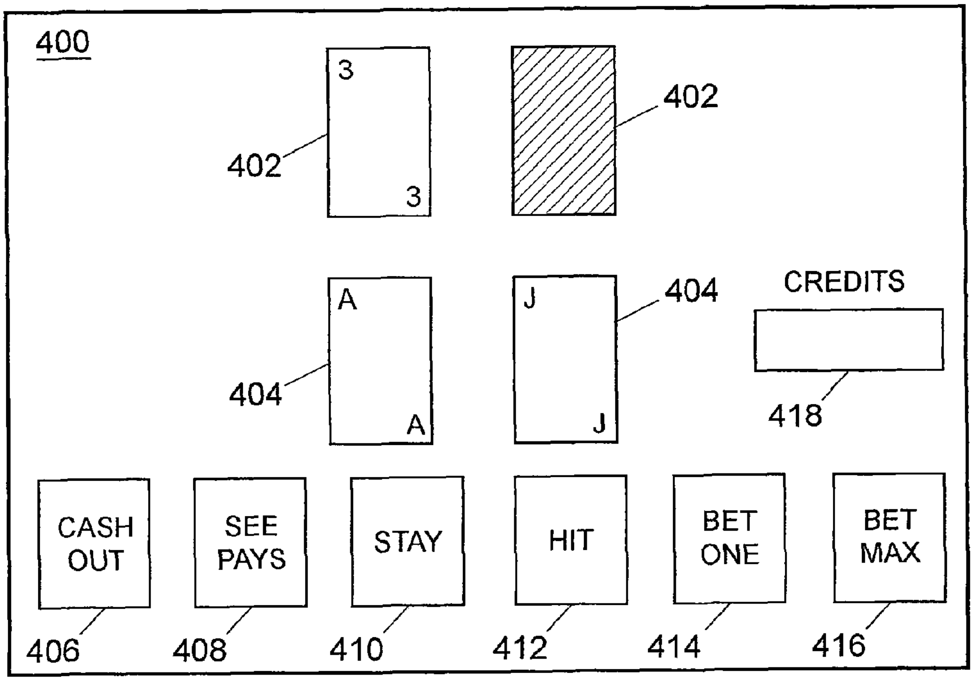
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
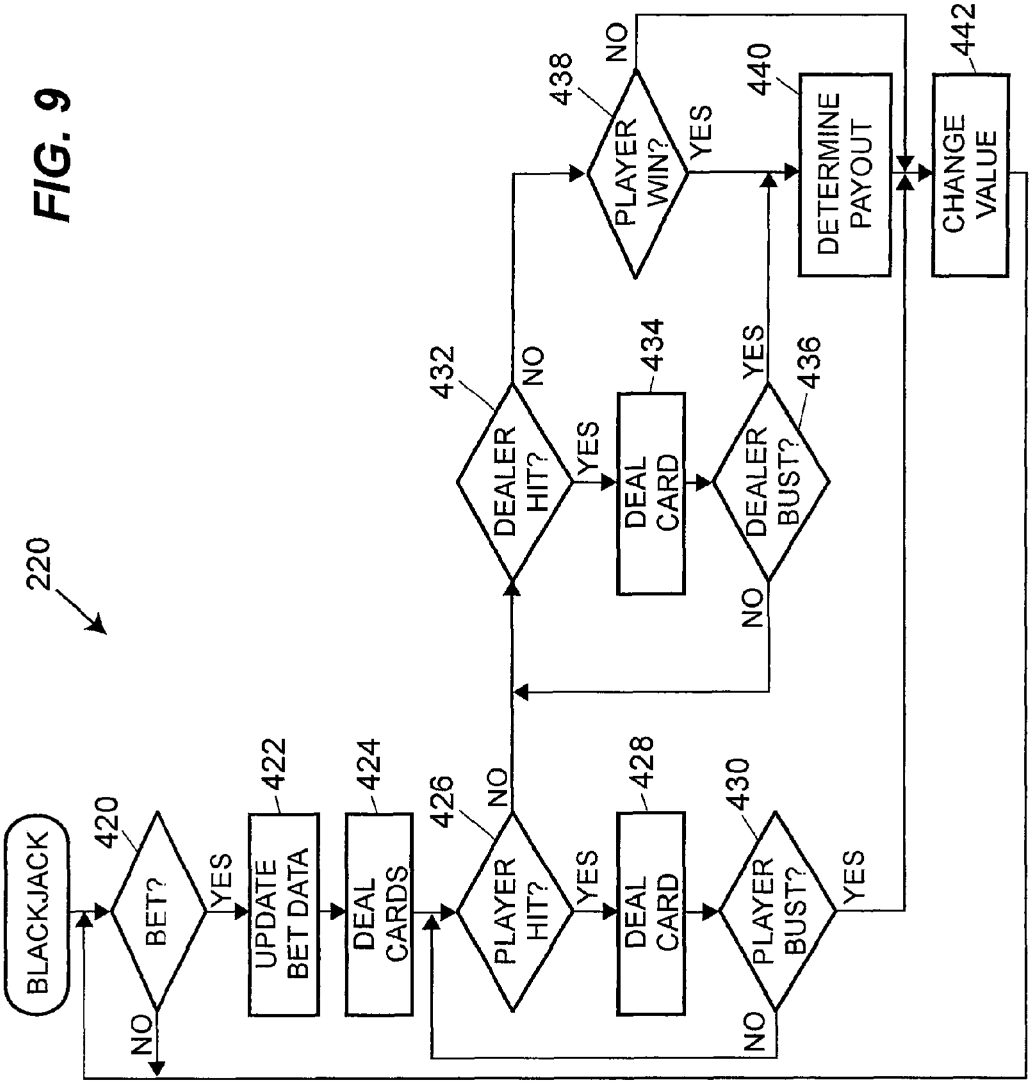
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

Figure 10:
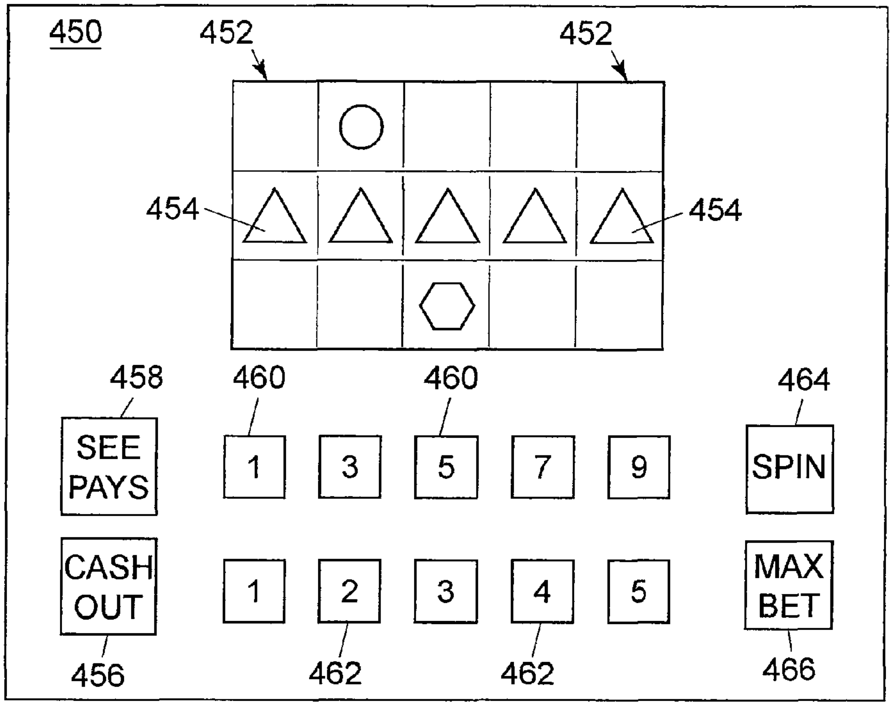
FIG. 10 is an illustration of an embodiment of a visual display that may be displayed during performance of the slots routine of FIG. 12.

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
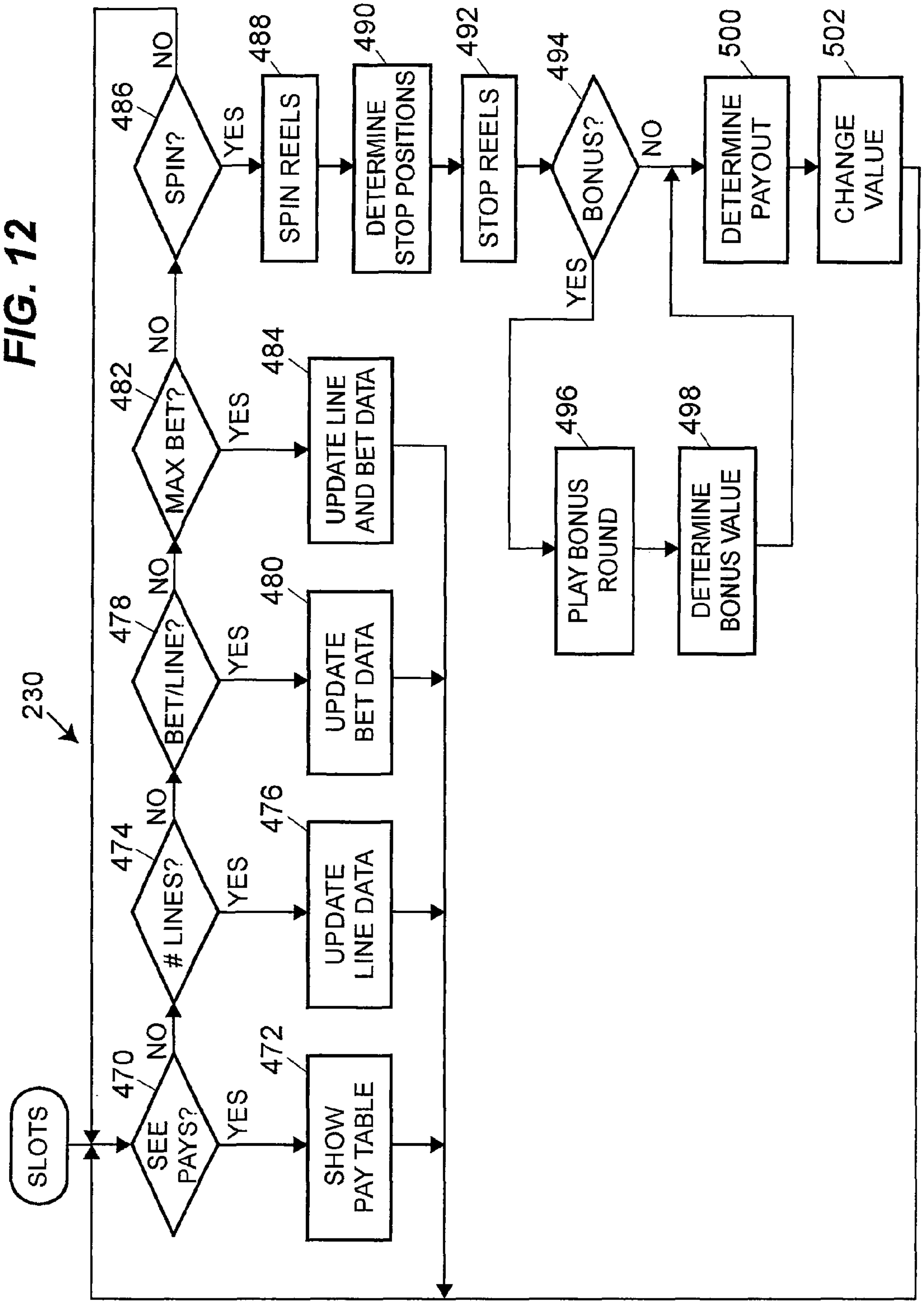
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described in the case where the display unit 70 is a video display unit, the display unit 70 may comprise a plurality of mechanical slot machine reels.

Video Keno

Figure 11:
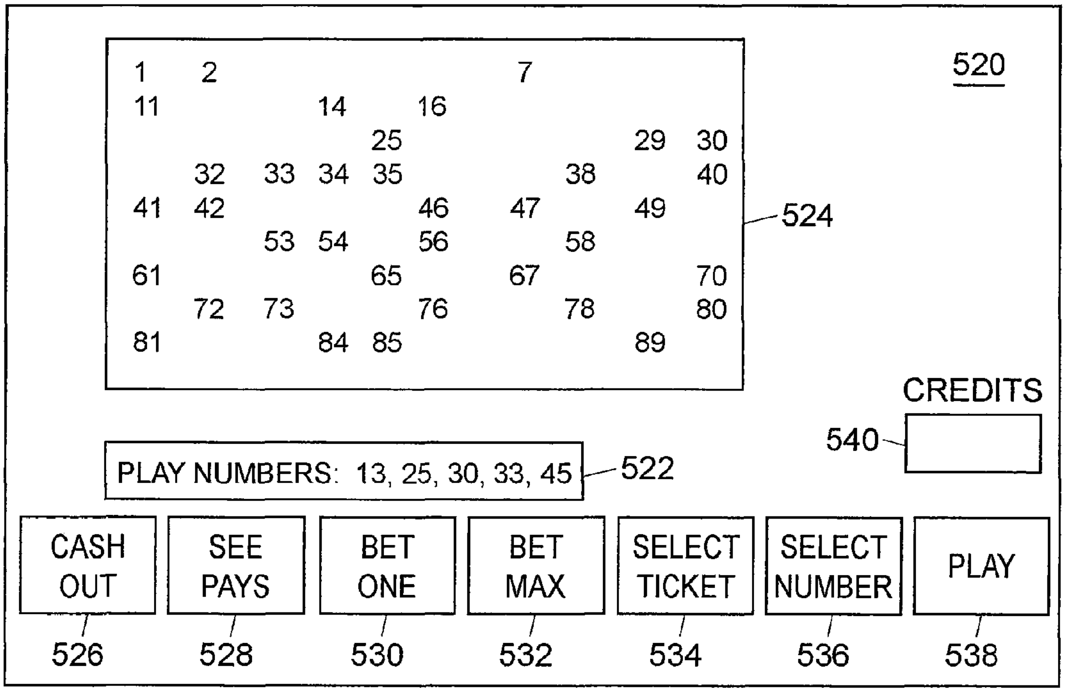
FIG. 11 is an illustration of an embodiment of a visual display that may be displayed during performance of the video keno routine of FIG. 13.

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
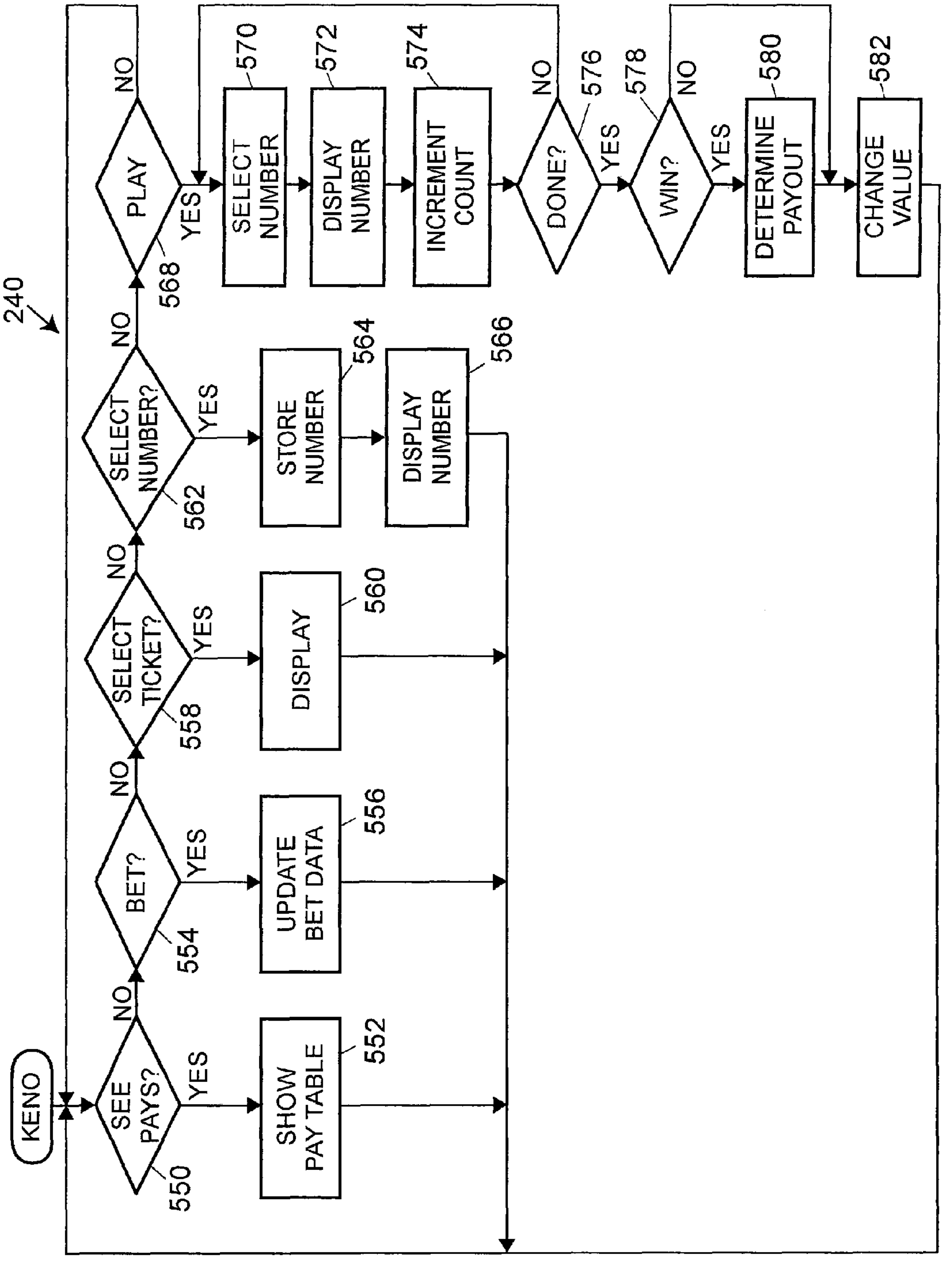
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
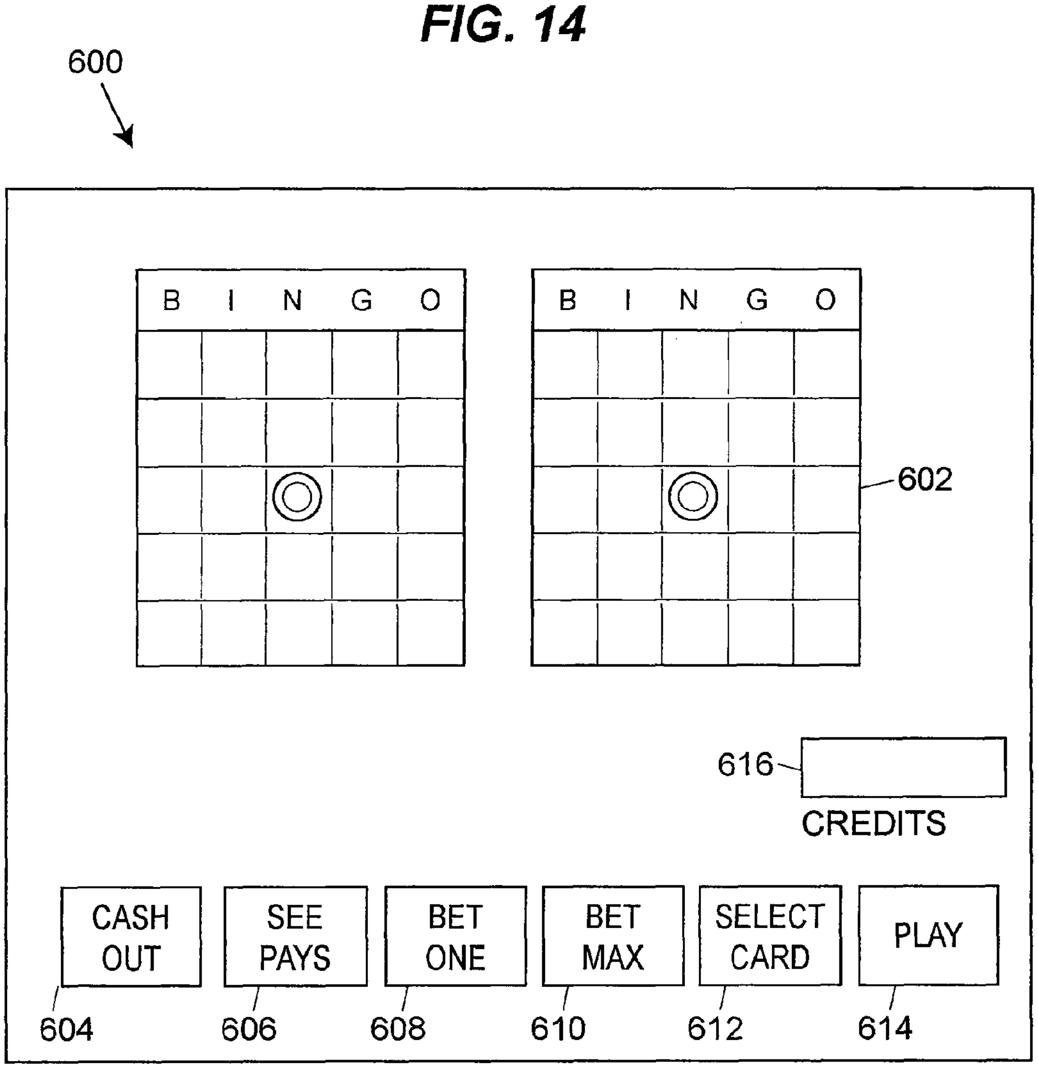
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70

Figure 15:
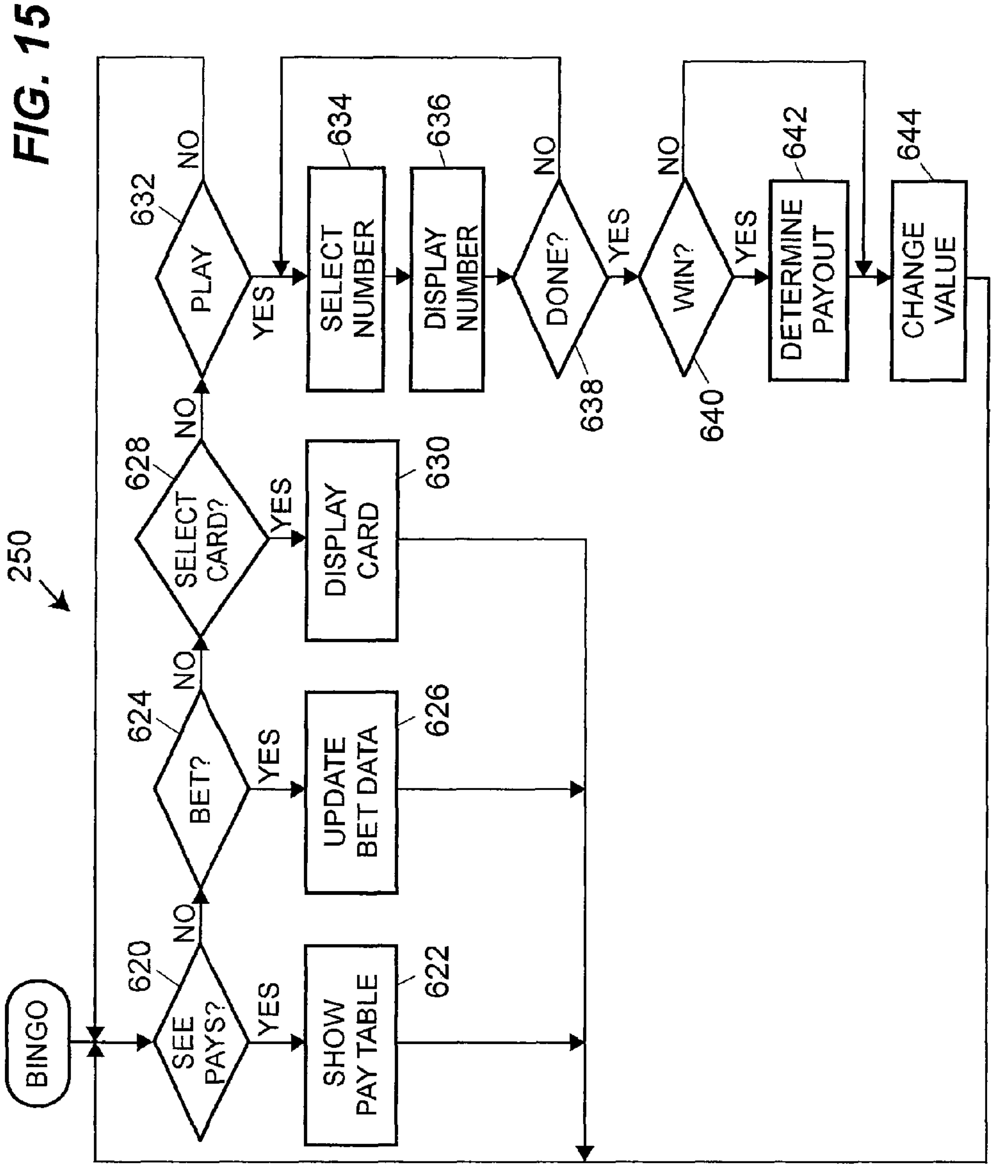
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

What is claimed is:

1. A gaming system, comprising:

a first gaming organization computer located at a facility of a gaming data authoring organization;

a network;

a second gaming organization computer located at a facility of a gaming regulatory organization;

a gaming apparatus including:

a display unit;

a value input device;

a controller operatively coupled to the display unit and the value input device, the controller comprising a processor and a memory operatively coupled to the processor and having first encrypted gaming data stored in the memory and second encrypted gaming data stored in the memory, the first encrypted gaming data having been generated by encrypting gaming data with a private encryption key of the gaming data authoring organization, and the second encrypted gaming data having been generated by encrypting the gaming data with a private encryption key of the gaming regulatory organization having the second gaming organization computer connected via the network with the first gaming organization computer of the gaming data authoring organization;

the controller being programmed to retrieve the first encrypted gaming data from the memory;

the controller being programmed to decrypt the first encrypted gaming data with a public encryption key of the first gaming data authoring organization to form first decrypted gaming data;

the controller being programmed to retrieve the second encrypted gaming data from the memory;

the controller being programmed to decrypt the second encrypted gaming data with a public encryption key of the gaming regulatory organization to form second decrypted gaming data;

the controller being programmed to determine whether the first decrypted gaming data decrypted by using the public encryption key of the gaming data authoring organization is identical to the second decrypted gaming data decrypted by using the public encryption key of the gaming regulatory organization; and the controller being programmed to enable a game play operation on the gaming apparatus upon determining that the first decrypted gaming data is identical to the second decrypted gaming data.

2. A gaming system as defined in claim 1, wherein the controller is programmed to cause the display unit to generate a game display representing poker, blackjack, slots, keno, or bingo.

3. A gaming system as defined in claim 1, wherein the gaming data comprises substantially all gaming data necessary to facilitate play of a casino game.

4. A gaming system as defined in claim 1, wherein the display unit comprises a video display unit that is capable of generating video images.

5. A gaming system as defined in claim 1, wherein the private encryption key, of the gaming data authoring organization, used to encrypt the gaming data is different than the private encryption key, of the gaming regulatory organization, used to encrypt the gaming data.

6. A method of operating a gaming system, said method comprising:

retrieving from a memory first encrypted gaming data generated by encrypting gaming data relating to a casino game with a private encryption key of a gaming data authoring organization having a first gaming organization computer;

decrypting the first encrypted gaming data with a public encryption key of the gaming data authoring organization to form first decrypted gaming data;

retrieving from the memory second encrypted gaming data, the second encrypted gaming data generated by encrypting gaming data relating to a casino game with a private encryption key of a gaming regulatory organization having a second gaming organization computer connected via a network with the first gaming organization computer of the gaming data authoring organization;

decrypting the second encrypted gaming data with a public encryption key, stored within a controller, of the gaming regulatory organization to form second decrypted gaming data;

determining whether the first decrypted gaming data decrypted by using the public encryption key of the gaming data authoring organization is identical to the second decrypted gaming data decrypted by using the public encryption key of the gaming regulatory organization; and enabling a game play operation on a gaming apparatus upon determining that the first decrypted gaming data is identical to the second decrypted gaming data, wherein the game play operation includes:

receiving value from a player via a value device;

accepting an input from the player via an input device;

generating, via a processor of the controller, an output of the casino game based on the input;

displaying the output on a display unit upon receiving the value.

7. A method as defined in claim 6, additionally comprising generating a game display representing poker, blackjack, slots, keno, or bingo on the gaming apparatus.

8. A method as defined in claim 6, comprising retrieving from the memory the gaming data that comprises substantially all gaming data necessary to facilitate play of the casino game.

* * * * *